US008259102B2

(12) United States Patent
Lim et al.

(10) Patent No.: US 8,259,102 B2
(45) Date of Patent: Sep. 4, 2012

(54) METHOD AND SYSTEM FOR PRODUCING 3D FACIAL ANIMATION

(75) Inventors: Seong Jae Lim, Daejeon (KR); Jeung Chul Park, Daejeon (KR); Chang Woo Chu, Daejeon (KR); Ho Won Kim, Daejeon (KR); Ji Young Park, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 818 days.

(21) Appl. No.: 12/314,785

(22) Filed: Dec. 16, 2008

(65) Prior Publication Data

US 2009/0153554 A1    Jun. 18, 2009

(30) Foreign Application Priority Data

Dec. 17, 2007  (KR) .................. 10-2007-0132668

(51) Int. Cl.
*G06T 15/70* (2006.01)
(52) U.S. Cl. ........ 345/419; 345/420; 345/423; 345/424; 345/425; 345/426; 345/427; 382/103; 382/107; 382/108; 382/291
(58) Field of Classification Search .................. 345/419, 345/420, 423, 427; 382/103, 107, 108, 291
See application file for complete search history.

(56) References Cited

U.S. PATENT DOCUMENTS

| | | | | |
|---|---|---|---|---|
| 5,689,575 A | * | 11/1997 | Sako et al. | 382/118 |
| 6,121,953 A | * | 9/2000 | Walker | 345/156 |
| 6,188,776 B1 | * | 2/2001 | Covell et al. | 382/100 |
| 6,504,546 B1 | * | 1/2003 | Cosatto et al. | 345/473 |
| 6,580,811 B2 | * | 6/2003 | Maurer et al. | 382/103 |
| 7,098,920 B2 | | 8/2006 | Marschner et al. | |
| 7,212,664 B2 | * | 5/2007 | Lee et al. | 382/154 |
| 7,218,320 B2 | * | 5/2007 | Gordon et al. | 345/419 |
| 7,266,225 B2 | * | 9/2007 | Mariani et al. | 382/118 |
| 7,372,981 B2 | * | 5/2008 | Lai et al. | 382/118 |
| 7,379,071 B2 | * | 5/2008 | Liu et al. | 345/582 |
| 7,606,392 B2 | * | 10/2009 | Gordon et al. | 382/103 |

(Continued)

FOREIGN PATENT DOCUMENTS

JP    10-255070    9/1998

(Continued)

OTHER PUBLICATIONS

Graf, H.P. et al.; Robust Recognition of Faces and Facial Features with a Multi-Modal System; Systems, Man, and Cybernetics, 1997, vol. 3, pp. 2034-2039.*

(Continued)

*Primary Examiner* — Xiao M. Wu
*Assistant Examiner* — Todd Buttram
(74) *Attorney, Agent, or Firm* — Staas & Halsey LLP

(57) ABSTRACT

A method for producing a 3D facial animation using a single facial video stream, includes producing a representative joint focused on a major expression producing element in a 3D standard facial model, producing a statistical feature-point model of various facial expressions of different people in the 3D standard facial model, moving each feature-point of the statistical feature-point model by tracking a change in facial expressions of the video stream, calculating a transformation coefficient of the representative joint corresponding to a variation of the feature-point of the 3D standard facial model, and producing a 3D facial animation by applying the calculated transformation coefficient to transform the representative joint.

16 Claims, 5 Drawing Sheets

U.S. PATENT DOCUMENTS

| | | | |
|---|---|---|---|
| 2003/0012408 A1* | 1/2003 | Bouguet et al. | 382/103 |
| 2003/0123754 A1* | 7/2003 | Toyama | 382/291 |
| 2005/0031194 A1* | 2/2005 | Lee et al. | 382/154 |
| 2008/0136814 A1* | 6/2008 | Chu et al. | 345/419 |
| 2008/0159608 A1* | 7/2008 | Suetens et al. | 382/128 |
| 2009/0028380 A1* | 1/2009 | Hillebrand et al. | 382/100 |
| 2009/0153552 A1* | 6/2009 | Fidaleo et al. | 345/419 |

FOREIGN PATENT DOCUMENTS

| | | |
|---|---|---|
| KR | 10-2000-0037591 A | 7/2000 |
| KR | 10-2004-0007921 A | 1/2004 |
| KR | 10-2006-0109044 | 10/2006 |

OTHER PUBLICATIONS

Walker, K.N.; Determining Correspondences for Statistical Models of Facial Appearance; 2000; Automatic Face and Gesture Recognition, pp. 271-276.*

Lukasz Zalewski et al., "2D Statistical Models of Facial Expressions for Realistic 3D Avatar Animation", 2005 IEEE, vol. 2, pp. 217-222.

Fadi Dornaika et al., "View- and Texture-Independent Facial Expression Recognition in Videos Using Dynamic Programming", 2005 IEEE, vol. 2, pp. 1314-1317.

Korean Office Action issued on Apr. 24, 2009 in corresponding Korean Patent Application 10-2007-0132668.

* cited by examiner

METHOD AND SYSTEM FOR PRODUCING 3D FACIAL ANIMATION

CROSS-REFERENCE(S) TO RELATED APPLICATIONS

The present invention claims priority of Korean Patent Application No. 10-2007-0132668, filed on Dec. 17, 2007, which is incorporated herein by reference.

FIELD OF THE INVENTION

The present invention relates to a method and system for producing a 3D facial animation and, more particularly, a method and system for producing a 3D facial animation using a single video stream.

BACKGROUND OF THE INVENTION

Examples of a conventional method for producing a 3D facial animation include a manual method using a special modeler, an example-based method, and a method using a facial motion capture system. The manual method by a special modeler is a method producing a facial expression by controlling each vertex of a 3D facial mesh. The example-based method makes in advance 3D models of various facial expressions for a facial animation to be produced and produces a new expression by a combination of the facial models. The 3D facial model made by this method is called a blend shape. The method using a motion capture system produces a 3D facial animation by applying several tens of optical markers to a performer's face, taking photographs of the performer's face by using a high-speed infrared camera, and tracking 3D movements of the optical makers obtained by the photographing.

In the aforementioned conventional art, the manual method using a special modeler is capable of producing a relatively natural facial animation. However, this manual method has the problems in that the produced facial animation is different depending on the used modeler and a long time is required.

The example-based method has the problem in that the accuracy of the produced facial animation depends on the accuracy of the models which are made in advance and the extent of combinations of the models.

The method using a motion capture system is fast in terms of a work processing speed and is capable of producing a high quality animation. However, this method incurs high costs since it needs an expensive system.

SUMMARY OF THE INVENTION

It is, therefore, an object of the present invention to provide a method and system for producing a 3D facial animation by tracking the facial expressions of a performer photographed using a single video camera by an algorithm of feature-points, and rotating and moving a joint in an existing 3D standard facial model, without depending on a special modeler or an expensive facial motion capture system.

In accordance with on aspect of the invention, a method for producing a 3D facial animation using a single facial video stream, includes (a) producing a representative joint focused on a major expression producing element in a 3D standard facial model, (b) producing a statistical feature-point model of various facial expressions of different people in the 3D standard facial model, (c) moving each feature-point of the statistical feature-point model by tracking a change in facial expressions of the video stream, (d) calculating a transformation coefficient of the representative joint corresponding to a variation of the feature-point of the 3D standard facial model, and (e) producing a 3D facial animation by applying the calculated transformation coefficient to transform the representative joint. In the (a) step, the representative joint is produced by analyzing facial anatomical characteristics and various facial expressions of different people and classifying the joints. In the (a) step, a representative joint template model using the model producing the representative joint as a template is transitioned to a new 3D standard facial model. In the (c) step, the feature-point is tracked and moved by reflecting locality based on a color information variation of the video stream and geometrical characteristics of the facial expression. The tracking of the feature-point is performed by tracking head motion, and the head motion is produced by calculating rotation/movement transformation coefficients of neck joint of the model by matching texture of the video stream with texture obtained by performing rotation/movement transformation of the neck joint and by performing rotation/movement transformation of a neck joint of the 3D standard facial model using the rotation/movement transformation coefficients of the neck joint. In the (c) step, contour line information of eyes and mouth regions, obtained by setting threshold values of a hue channel and a saturation channel where a log operation is performed in a HSI color space of the video stream and by removing a noise through a median filter, is used as a tracking limitation condition of the feature-point. In the (d) step, an estimated displacement variable of the representative joint is calculated by comparing a variation of each joint according to the rotation/movement transformation of the representative joint of the 3D standard facial model with a variation of the corresponding feature-point through the rotation/movement transformation which the individual weight is applied. In the (d) step, the rotation/movement transformation coefficient is calculated by locally rotating/moving the joint corresponding to each feature-point in accordance with the variation of the feature-point after globally rotating/moving the representative joint.

In accordance with another aspect of the invention, a system for producing a 3D facial animation using a single facial video stream, includes a representative joint producing unit for producing a representative joint focused on a major expression producing element in a 3D standard facial model, a feature-point model producing unit for producing a statistical feature-point model of various facial expressions of different people in the 3D standard facial model where the representative joint is produced, a feature-point tracking unit for moving and changing each feature-point of the statistical feature-point model by tracking a change in facial expressions of the video stream, a represent joint transformation coefficient calculating unit for calculating a transformation coefficient of the representative joint corresponding to a variation of the feature-point of the 3D standard facial model, and a representative joint transforming unit for producing a 3D facial information by applying the calculated transformation coefficient to the representative joint to be transformed. The representative joint producing unit produces the representative joint by analyzing facial anatomical characteristics and various facial expressions of different people and classifying the joints. The representative joint producing unit transitions a representative joint template model using the model producing the representative joint as a template to a new 3D standard facial model. The feature-point tracking unit tracks and moves the feature-point by reflecting locality based on a color information variation of the video stream and geometrical characteristics of the facial expression. The tracking of the feature-point is performed by tracking head motion, and the head motion is produced by calculating rotation/movement transformation coefficients of neck joint of the model by matching texture of the video stream with texture obtained by performing rotation/movement transformation of the neck joint and by performing rotation/movement transformation of a neck joint of the 3D standard facial model using the rotation/movement transformation coefficients of the neck joint. The feature-point tracking unit obtains contour line information of eyes and mouth regions by setting threshold values of a hue channel and a saturation channel where a log operation is performed in a HSI color space of the video stream and by removing a noise through a median filter, and uses the contour line information of the eyes and the mouth regions as a tracking limitation condition of the feature-point. The represent joint transformation coefficient calculating unit calculates an estimated displacement variable of the representative joint by comparing a variation of the rotation/movement transformation, where the individual weight is applied, of each joint according to the rotation/movement transformation of the representative of the representative joint of the 3D standard facial model with the variation of the corresponding feature-point. The represent joint transformation coefficient calculating unit calculates the rotation/movement transformation coefficient by locally rotating/moving the joint corresponding to each feature-point in accordance with the variation of the feature-point after globally rotating/moving the representative joint.

BRIEF DESCRIPTION OF THE DRAWINGS

The above and other objects and feature-points of the present invention will become apparent from the following description of embodiments given in conjunction with the accompanying drawings, in which.

DETAILED DESCRIPTION OF THE EMBODIMENTS

Hereinafter, preferred embodiments of the present invention will be described in detail with reference to the accompanying drawings so that they can be readily implemented by those skilled in the art. Where the function and constitution are well-known in the relevant arts, further discussion will not be presented in the detailed description of the present invention in order not to unnecessarily make the gist of the present invention unclear.

In the present invention to produce changes in a moving picture (video stream) of facial expressions of a performer photographed using a single video camera as a 3D facial model animation, the 3D facial model animation is produced by setting a representative joint which represents the joints of a 3D Joint-Skeleton standard facial model stored in advance, tracking expressional changes in the input video stream by an algorithm of feature-points, and finding rotation/movement transformation coefficient values of the representative joints to optimize the positions of the joints of the 3D standard facial model corresponding to the feature-points. The 3D standard facial model comprises bones in a hierarchical structure and a number of joints and weight. Each joint is an end point between the bones and the weight indicates the extent to which each joint influences vertexes around the joint. Coordinates of all vertexes are re-calculated by the rotation/movement transformation of the joint, to produce a new expression.

Figure 1:
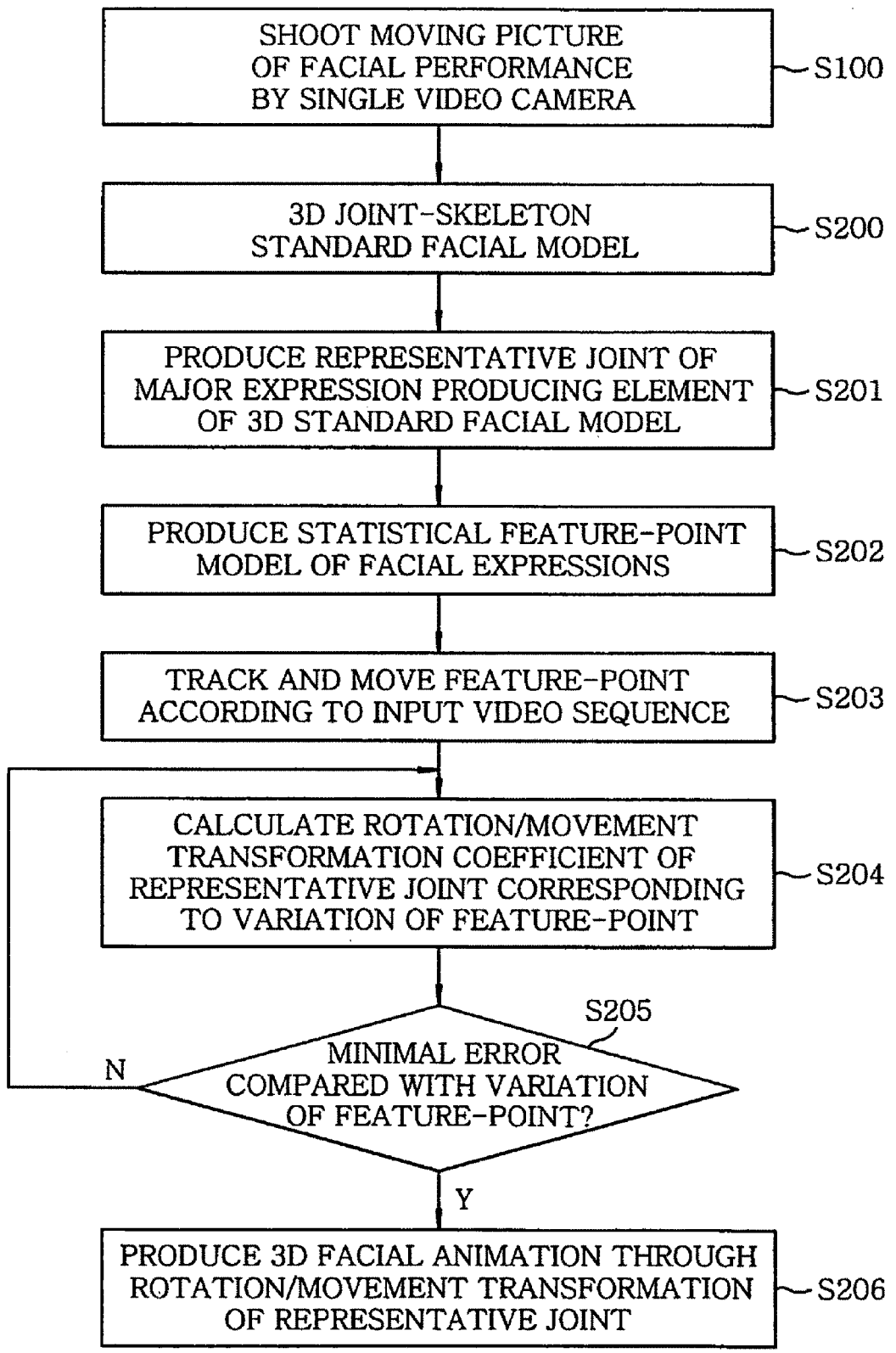
FIG. 1 is a flow chart for explaining a process of producing a 3D facial animation by a system for producing a 3D facial animation in accordance with an embodiment of the present invention.

FIG. 1 is a flow chart for explaining a process of producing a 3D facial animation by a system for producing a 3D facial animation in accordance with an embodiment of the present invention.

Referring to FIG. 1, a method for producing a 3D facial animation comprises: steps S100, S200 and S201 of producing a representative point focusing on a major expression producing element in a 3D standard facial model; step S202 of producing a statistical feature-point model of various facial expressions of different people in the 3D standard facial model in which the representative joint is produced; step S203 of tracking facial expressional changes of the single facial video stream and moving/changing each feature-point of the statistical feature-point model; steps S204 and 205 of calculating a rotation/movement transformation coefficient of the representative joint corresponding to a variation of the feature-point of the 3D standard facial model; and step S206 of applying the calculated rotation/movement transformation coefficient, to produce the 3D facial animation.

The method for producing a 3D facial animation according to the present invention will be described in more detail below:

When the facial expressions of a performer is shot by a single video camera in step S100, a representative joint producing unit reads a pre-stored 3D Joint-Skeleton standard facial model in step S200.

Figure 2:
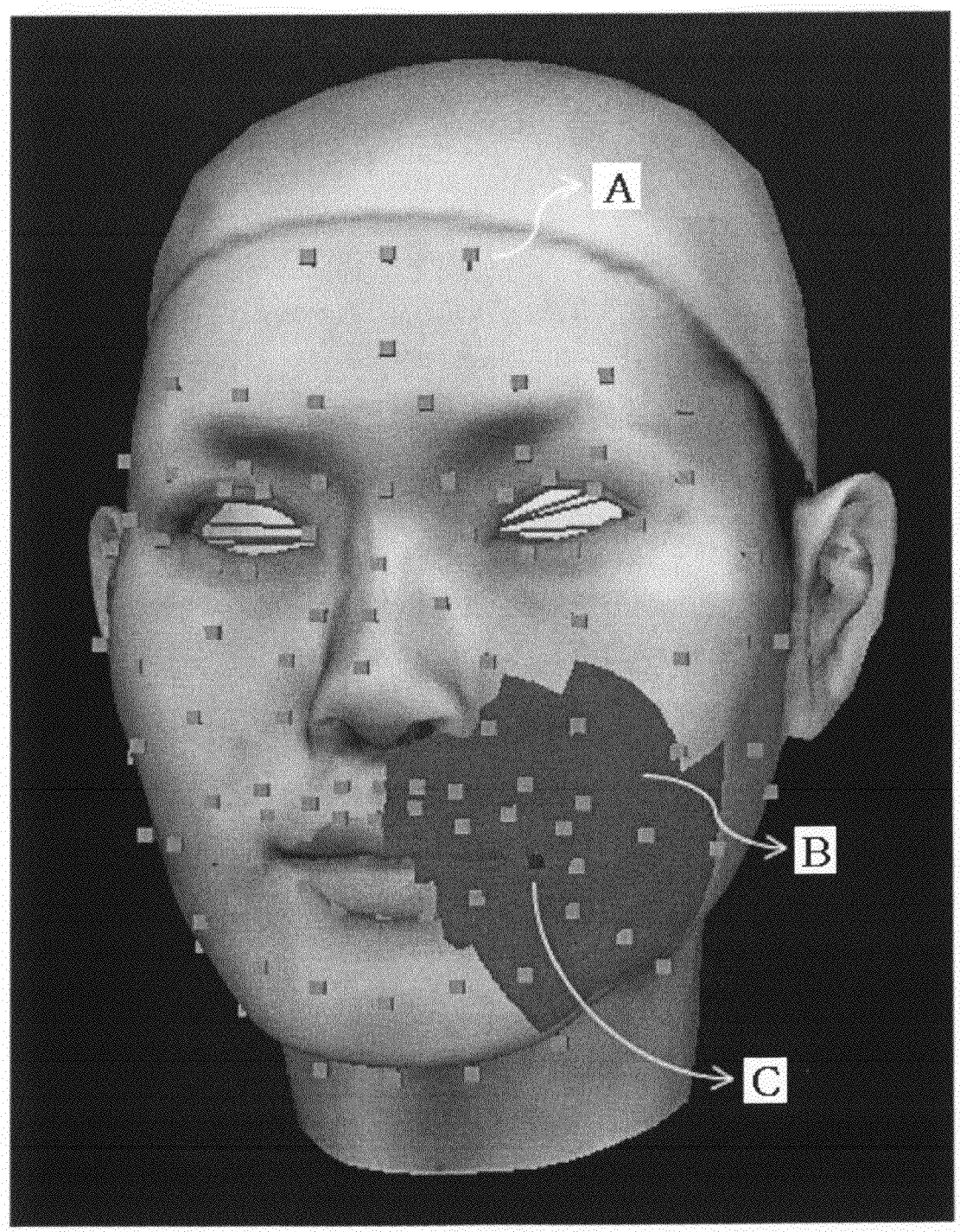
FIG. 2 is a picture illustrating a range of influence of a representative joint in the mouth region which is one of major expression elements of a 3D Joint-Skeleton facial model.

The 3D standard facial model comprises bones in a hierarchical structure and a number of joints and weight. Each joint is an end point between the bones and the weight indicates the extent to which each joint influences vertexes around the joint. The coordinates of the vertexes influenced by each joint are re-calculated according to the rotation/movement transformation of each joint, to control the animation. FIG. 2 illustrates the 3D Joint-Skeleton facial model. In FIG. 2, 'A' point indicates each joint. However, when a method only using the A point of FIG. 2 is used, since the rotation/movement transformation operation of generally 100 or more joints is performed, an operation time becomes longer and a process becomes more complicated.

Subsequently, a representative joint producing unit classifies major expression producing elements (for example, an eye, a mouth and an eyebrows) of producing an facial expression of each joint of the 3D Joint-Skeleton standard facial model and produces a representative joint which represents movements of the joints belonging to each element in step S201. The production of the representative joint transitions a representative joint template model in a new 3D standard facial model. The representative joint template model uses the 3D standard facial model having the produced representative joint as a template.

In FIG. 2, a 'C' point indicates the representative joint of a side end of the mouth element, and the B region which is darker region surrounding the C point on the face indicates the region of the joints influenced by the representative joint. The Joint-Skeleton structure can be used as a facial animation template model applicable to any facial model made for the 3D facial animation.

Head motion tracking for the animation of a 3D facial model is performed by using the matching relation with the facial contour line of an input image, based on the silhouette information of a facial front view of the 3D facial model, and a template matching technique, based on the texture information of a facial region of the 3D facial model. This is a method for calculating optimal rotation/movement transformation coefficients of neck (neck region) joints of the model, by matching the texture of the input image with the texture obtained by rotating/moving the neck joint of the model. That is, the head motion is produced by performing the optimal rotation/movement transformation of the neck joint.

Figure 3:
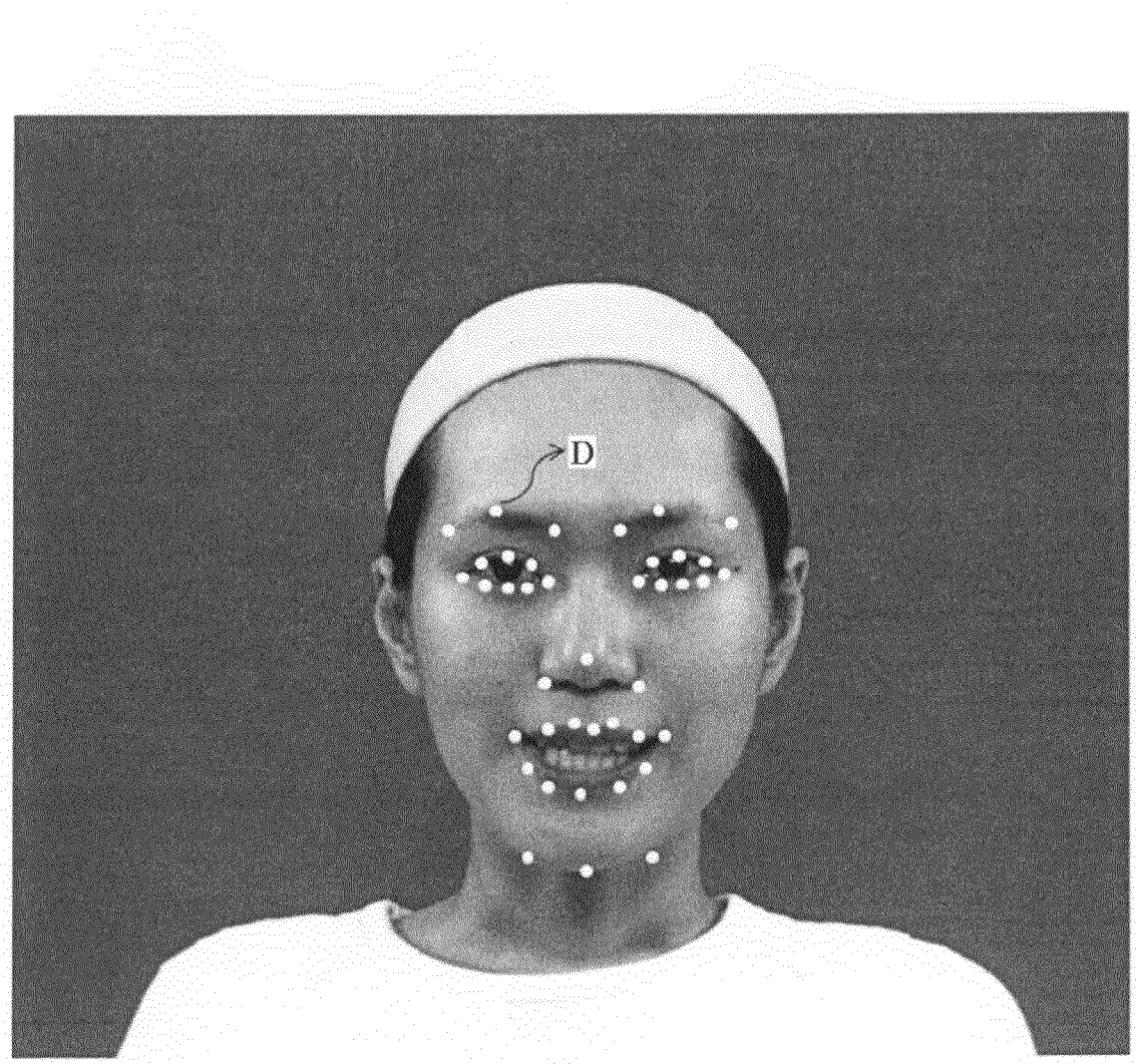
FIG. 3 is a picture for explaining a model of feature-points in accordance with the present invention.

The 3D facial animation is produced by tracking changes in the feature-points on the major expressional elements in the moving picture which is input from the video camera, and calculating a rotation/movement transformation coefficient of the representative joint to optimally match each of the joints of the 3D facial model corresponding to the feature-points. For this purpose, a feature-point model producing unit produces a feature-point model having a feature-point 'D' as illustrated in FIG. 3, based on the positions of the joints of the 3D Joint-Skeleton standard facial model and the regions of the major expression producing elements producing the facial expression in step S202.

Further, to more accurately and reliably track the movements of the feature-points, a feature-point tracking unit selects various faces of different people as training data, sets the feature-points in each training data, and calculates changes in the position of the feature-points and in the texture information around the feature-points as statistical data information. From the statistical data information of the feature-points based on these various facial data, an average position shape of the feature-points, a feature-point distribution model and average texture information of each feature-point are generated through the principal component analysis (PCA). The feature-point model produced in the above-described manner is used as the initial position of the feature-point and the data for tracking the feature-point when a new facial moving picture is input.

A conventional statistical model-based technique does not effectively reflect the regional characteristics of new facial data to be searched and is too sensitive to a color information variation of each moving picture frame. Therefore, for speedly and accurately tracking the movements of feature-points, the present invention adds a variable which reflects the locality of each input image to the conventional statistical model-based technique, as shown in Formula 1:

$$m = \overline{m} + Pb = La \qquad \text{[Formula 1]}$$

wherein m is a 2D coordinate vector of the feature-points, $\overline{m}$ is an average coordinate vector of the feature-points obtained from the training data, P is an eigenvector matrix of a covariance matrix of the feature-points obtained from the training data and defines a deviation mode of a shape variation, b is a vector of a model coefficient and controls the extent of being varied from an average shape, L indicates the contour line information at each feature-point position based on the color information of the input image, and a is a vector indicating the geometrical symmetry of the feature-points in each major expression element.

To reflect the locality of each input image, the input image is changed into a color space of hue saturation intensity (HSI) where a brightness value is adjusted. To intensify the characteristics of a hue channel, a log operation is performed. Subsequently, threshold values of the hue channel and saturation (chroma) channel are set by using the color characteristics of the major expression elements where expressions are relatively frequently changed, thereby performing image binarization. Through the image binarization, specifically, the eye and the mount regions are separated from the facial region and the contour line information of the eye and the mouth regions is obtained by removing a noise through a median filter. When each feature-point of the statistical model is changed, the contour line information as a local limitation condition is reflected as the variable L in Formula 1, thereby to find a position of a more accurate feature-point of the major expression element considering the local characteristics of each input image. That is, in the color space of HSI of the video stream where the brightness value is adjusted, the image binarization is performed by setting the threshold values of the hue channel and the saturation channel where the log operation is performed, and the contour line information of the eye and the mouth regions obtained by removing the noise through the median filter is used as the tracking limitation condition of the feature-point. Further, the anatomical characteristics of the major expression elements of the face, that is, the geometrical symmetry of the left and right feature-points about the eyes, the mouth or the like according to the facial bilateral symmetry, are reflected as the vector of a in Formula 1, to decrease errors in tracking the feature-points and more accurately track the positions of the feature-points in step S203.

In step 204, to produce the 3D facial animation, a representative joint transformation coefficient calculating unit finds a rotation/movement transformation coefficient value of each representative joint so that the positions of the joints of the 3D standard facial model corresponding to the feature-points are optimized.

The representative joints are set at the major expression elements in the 3D Joint-Skeleton standard facial model. Each representative joint controls a number of the joints. Thus, as each representative joint is rotated or moved, each of the joints within the range of influence of the representative joint is rotate or moved by the given weight. In this manner, each joint is rotated or moved, thereby moving vertexes around the joint to produce the facial animation. Then, to minimize an error in the variation of each feature-point and in the transformation extent to which each joint is rotated/moved in the input moving picture, the rotation/movement transformation coefficient of the representative joint is calculated using Formula 2 below:

$$\mathrm{argmin}_{\Delta p} \left\| \sum_{i=1}^{n} (m_i - J_i(T(j_R; p + \Delta p))) \right\| \qquad \text{[Formula 2]}$$

wherein, $m_i$ indicates a vector of an $i^{th}$ feature-point and $J_i$ indicates rotation/movement transformation of an $i^{th}$ joint depending on rotation/movement transformation $p+\Delta p$ of a representative joint $j_R$. When the representative joint $j_R$ performs the rotation/movement transformation by $\Delta p$, each joint influenced by the representative joint $j_R$ performs the rotation/movement transformation considering its individual weight. Comparing with the variation of the feature-point corresponding to the result, the optimal rotation/movement transformation $\Delta p$ is found in step S205. That is, after the global rotation/movement transformation of the representative joint, the local rotation/movement transformation of each joint corresponding to each feature point is performed in accordance with the variation of the feature-point, thereby finding the optimal rotation/movement transformation coefficient to produce a more detailed facial animation.

Figure 4A:
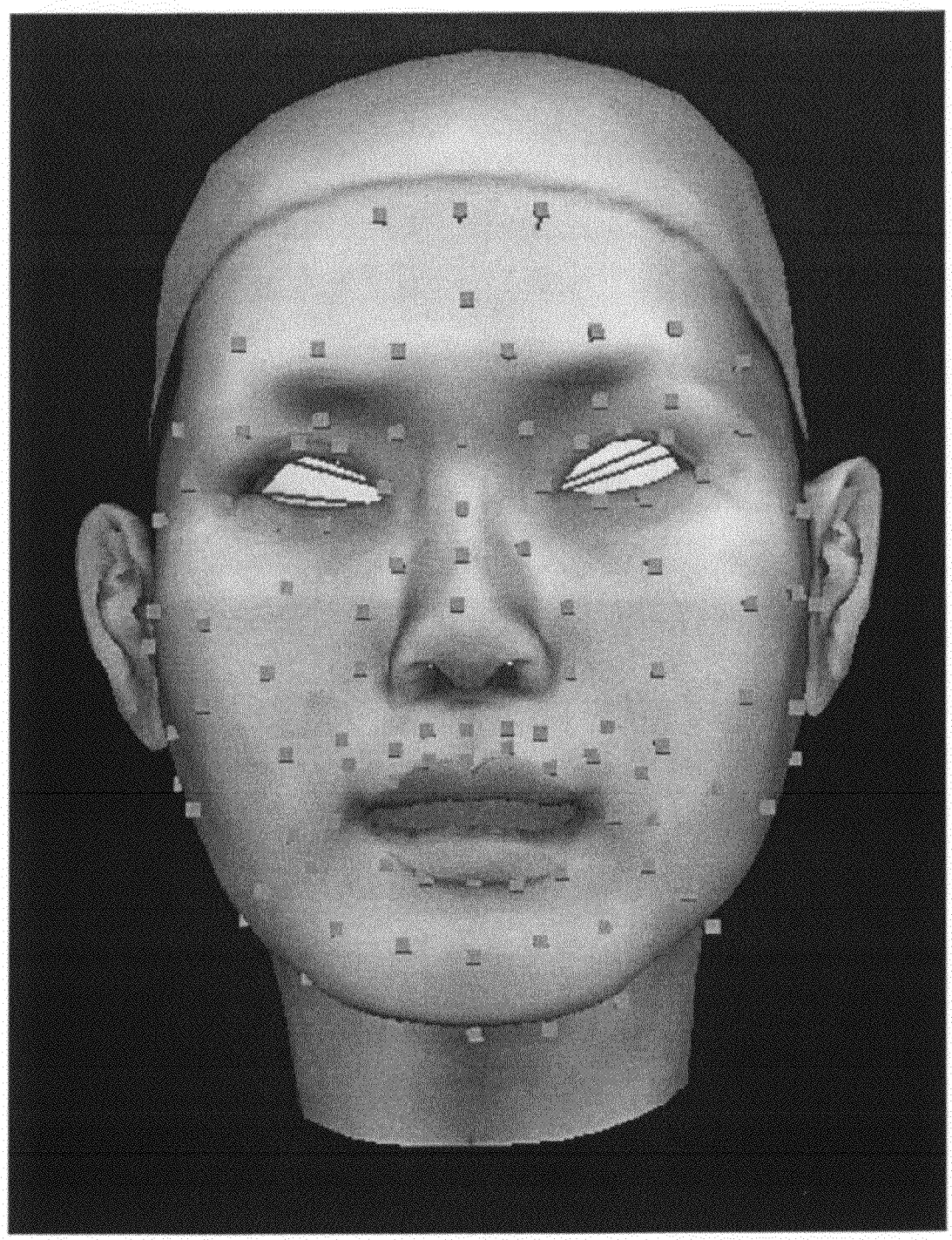
FIGS. 4A and 4B are pictures illustrating the result of producing the 3D facial animation by a method for producing a 3D facial animation in accordance with the present invention.
Figure 4B:
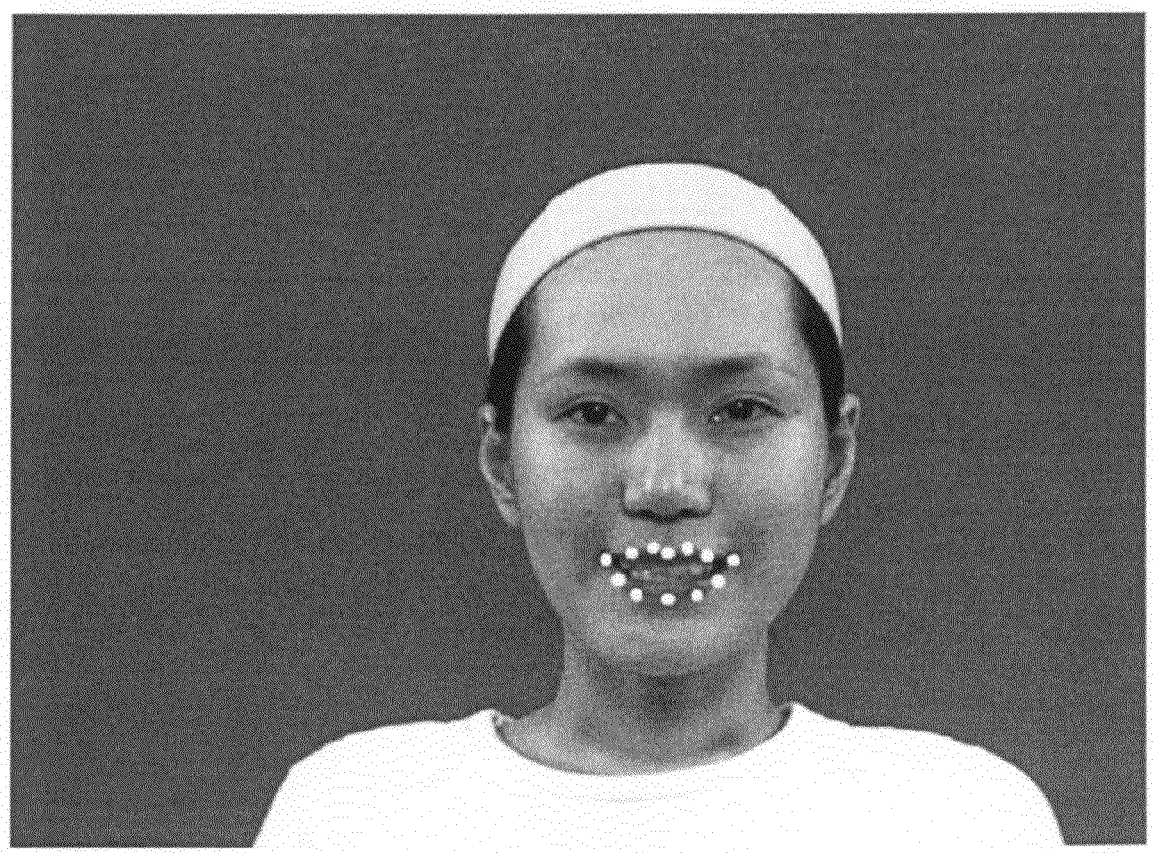

A representative joint transforming unit applies the optimal rotation/movement transformation coefficient to the representative joint and transforms the representative joint, to produce the 3D facial animation, as shown in FIG. 4A, in step S206. That is, the 3D facial animation shown in FIG. 4A is produced from an input video steam shown in FIG. 4B, according to this embodiment.

The system for producing a 3D facial animation in accordance with the present invention is realized as a program to be stored in a computer readable recoding medium (such as CD ROM, RAM, ROM, floppy disk, hard disk, magneto-optical disk or the like).

In accordance with the present invention, a 3D facial animation is easily produced by tracking facial features from a moving picture taken using a single video camera. Since the present invention can produces the 3D facial animation without depending on any special modeler or any expensive motion capture system, a processing speed are maximized and a cost are minimized.

While the invention has been shown and described with respect to the embodiments, it will be understood by those skilled in the art that various changes and modifications may be made without departing from the scope of the invention as defined in the following claims.

What is claimed is:

1. A method for producing a 3D facial expression animation using a single facial video stream, comprising:
   producing a representative joint focused on a major expression producing element in a 3D standard facial model;
   producing a statistical feature-point model of various facial expressions of different people in the 3D standard facial model;
   moving each feature-point of the statistical feature-point model by tracking a change in facial expressions of the single facial video stream;
   calculating a transformation coefficient of the representative joint corresponding to a variation of the feature-point of the 3D standard facial model according to the change in facial expressions of the single facial video stream; and
   producing a 3D facial expression animation by applying the calculated transformation coefficient to transform the representative joint,
   wherein the statistical feature-point model includes an average position shape of feature-points, a feature-point distribution model and an average texture information of each of the feature-points, and
   wherein the statistical feature-point model is used to determine an initial position of the each feature-point and a data for tracking the each feature-point of the single facial video stream.

2. The method of claim 1, wherein in the producing the representative joint, the representative joint is produced by analyzing facial anatomical characteristics and various facial expressions of different people and classifying the joints.

3. The method of claim 2, wherein in the of producing the representative joint, a representative joint template model using the model producing the representative joint as a template is transitioned to a new 3D standard facial model.

4. The method of claim 1, wherein in the moving, the feature-point is tracked and moved by reflecting locality based on a color information variation of the single facial video stream and geometrical characteristics of the facial expression.

5. The method of claim 4, wherein the tracking of the feature-point is performed by tracking head motion, and the head motion is produced by calculating rotation and movement transformation coefficients of neck joint of the model by matching texture of the single facial video stream with texture obtained by performing rotation and movement transformation of the neck joint and by performing rotation and movement transformation of a neck joint of the 3D standard facial model using the rotation and movement transformation coefficients of the neck joint.

6. The method of claim 4, wherein, in the moving, contour line information of eyes and mouth regions, obtained by setting threshold values of a hue channel and a saturation channel where a log operation is performed in a HSI color space of the single facial video stream and by removing a noise through a median filter, is used as a tracking limitation condition of the feature-point.

7. The method of claim 1, wherein, in the calculating, an estimated displacement variable of the representative joint is calculated by comparing a variation of each joint according to the rotation and movement transformation of the representative joint of the 3D standard facial model with a variation of the corresponding feature-point through the rotation and movement transformation which an individual weight is applied.

8. The method of claim 7, wherein, in the calculating, the rotation and movement transformation coefficient is calculated by locally rotating and moving the joint corresponding to each feature-point in accordance with the variation of the feature-point after globally rotating and moving the representative joint.

9. A system for producing a 3D facial expression animation using a single facial video stream, comprising:
   a representative joint producing unit for producing a representative joint focused on a major expression producing element in a 3D standard facial model;
   a feature-point model producing unit for producing a statistical feature-point model of various facial expressions of different people in the 3D standard facial model where the representative joint is produced;
   a feature-point tracking unit for moving and changing each feature-point of the statistical feature-point model by tracking a change in facial expressions of the single facial video stream;
   a represent joint transformation coefficient calculating unit for calculating a transformation coefficient of the representative joint corresponding to a variation of the feature-point of the 3D standard facial model according to the change in facial expressions of the single facial video stream; and
   a representative joint transforming unit for producing a 3D facial information by applying the calculated transformation coefficient to the representative joint to be transformed,
   wherein the statistical feature-point model includes an average position shape of feature-points, a feature-point distribution model and an average texture information of each of the feature-points, and
   wherein the statistical feature-point model is used to determine an initial position of the each feature-point and a data for tracking the each feature-point of the single facial video stream.

10. The system of claim 9, wherein the representative joint producing unit produces the representative joint by analyzing facial anatomical characteristics and various facial expressions of different people and classifying the joints.

11. The system of claim 10, wherein the representative joint producing unit transitions a representative joint template model using the model producing the representative joint as a template to a new 3D standard facial model.

12. The system of claim 9, wherein the feature-point tracking unit tracks and moves the feature-point by reflecting locality based on a color information variation of the single facial video stream and geometrical characteristics of the facial expression.

13. The system of claim 12, wherein the tracking of the feature-point is performed by tracking head motion, and the head motion is produced by calculating rotation and movement transformation coefficients of neck joint of the model by matching texture of the single facial video stream with texture obtained by performing rotation and movement transformation of the neck joint and by performing rotation and movement transformation of a neck joint of the 3D standard facial model using the rotation and movement transformation coefficients of the neck joint.

14. The system of claim 12, wherein the feature-point tracking unit obtains contour line information of eyes and mouth regions by setting threshold values of a hue channel and a saturation channel where a log operation is performed in a HSI color space of the single facial video stream and by removing a noise through a median filter, and uses the contour line information of the eyes and the mouth regions as a tracking limitation condition of the feature-point.

15. The system of claim 9, wherein the represent joint transformation coefficient calculating unit calculates an estimated displacement variable of the representative joint by comparing a variation of the rotation and movement transformation, where an individual weight is applied, of each joint according to the rotation and movement transformation of the representative of the representative joint of the 3D standard facial model with the variation of the corresponding feature-point.

16. The system of claim 15, wherein the represent joint transformation coefficient calculating unit calculates the rotation and movement transformation coefficient by locally rotating and moving the joint corresponding to each feature-point in accordance with the variation of the feature-point after globally rotating and moving the representative joint.

\* \* \* \* \*